United States Patent [19]
Lim

[11] Patent Number: 5,833,410
[45] Date of Patent: Nov. 10, 1998

[54] CHAMFER FORMING APPARATUS FOR A CRANK SHAFT OIL HOLE

[75] Inventor: Dong-Sik Lim, Ulsan-shi, Rep. of Korea

[73] Assignee: Hyundai Motor Company, Seoul, Rep. of Korea

[21] Appl. No.: 873,954

[22] Filed: Jun. 12, 1997

[30] Foreign Application Priority Data

Jun. 14, 1996 [KR] Rep. of Korea ............... 96-21372

[51] Int. Cl.⁶ .................................................. B23C 1/12
[52] U.S. Cl. ........................... 409/200; 408/35; 408/43; 408/234; 408/236
[58] Field of Search .................. 409/200; 408/35, 408/53, 43, 88, 234, 236

[56] References Cited

U.S. PATENT DOCUMENTS

| | | | |
|---|---|---|---|
| 2,289,111 | 7/1942 | Fett | 409/200 |
| 3,762,272 | 10/1973 | Escobedo | 409/200 |
| 4,050,354 | 9/1977 | Kuhnert | 408/35 |
| 4,109,593 | 8/1978 | Sorensen | 408/234 |
| 4,216,572 | 8/1980 | Matsushita et al. | 408/35 |
| 4,952,105 | 8/1990 | Kitamura | 408/234 |
| 5,065,492 | 11/1991 | Haas et al. | |
| 5,197,836 | 3/1993 | Crivellin | 409/200 |
| 5,702,212 | 12/1997 | Erath et al. | 408/236 |

*Primary Examiner*—Daniel W. Howell
*Assistant Examiner*—Adesh Bmargava
*Attorney, Agent, or Firm*—Finnegan, Henderson Farabow, Garrett & Dunner, L.L.P.

[57] ABSTRACT

A chamfer forming apparatus for a crank shaft oil hole is provided with a spindle chuck which is variably moved in response to different locations of a crank shaft oil hole inlet portion. The invention includes linearly translating rack gear driven by an oil pressure cylinder, a pinion gear driven by the rack gear, a drum coaxially mounted to the pinion gear, a spindle chuck eccentrically rotatably mounted to the drum, a chucking a chamfer working tool, an adjusting bracket fixedly mounted to top end of the drum, a stopper member on two sides of the adjusting bracket, and a fixing bracket provided on the housing to limit the rotation of the drum within a predetermined angle range by contact with the stoppers.

4 Claims, 5 Drawing Sheets

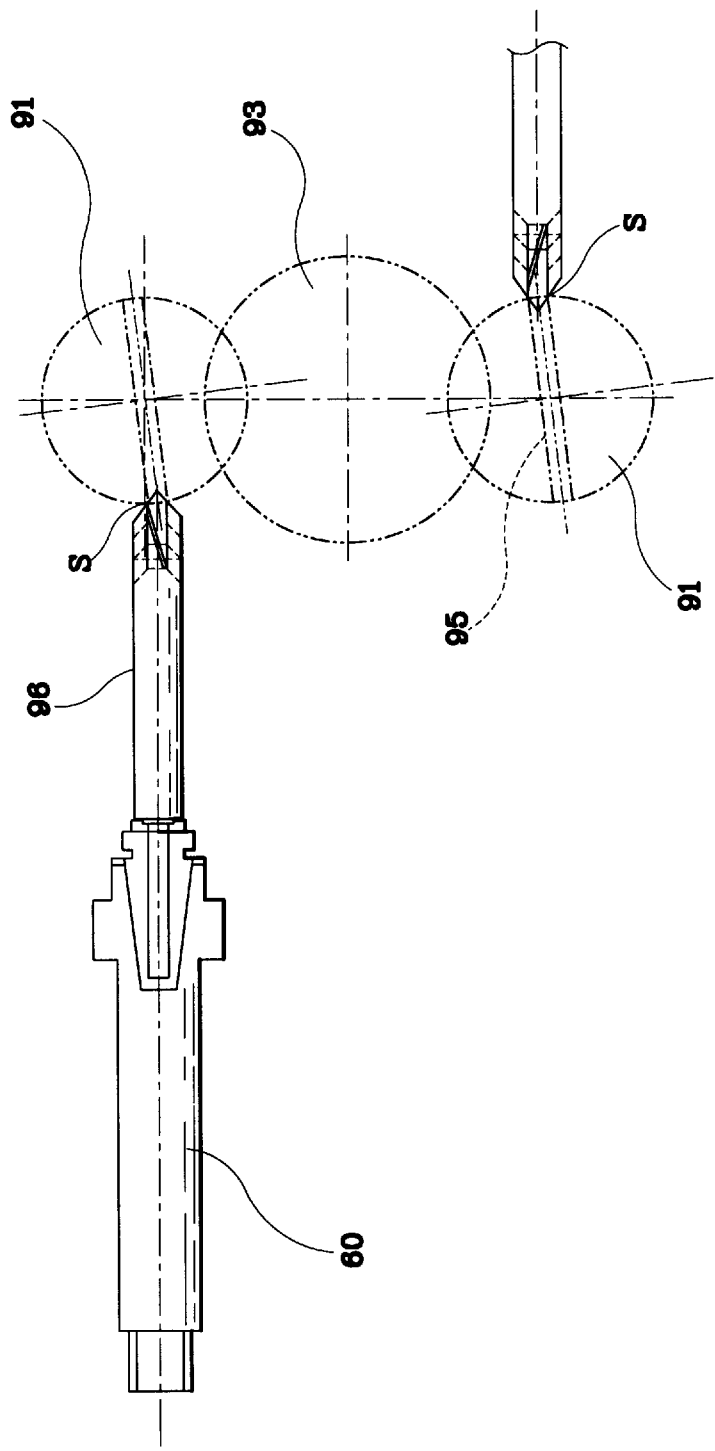

CHAMFER FORMING APPARATUS FOR A CRANK SHAFT OIL HOLE

BACKGROUND OF THE INVENTION

1. Field of the Invention

The present invention relates to a chamfer forming apparatus for a crank shaft oil hole, and more particularly to a chamfer forming apparatus for a crank shaft oil hole which can change positions of a turret head in accordance with crank shafts having different oil hole locations.

2. Description of the Related Art

FIG. 4 illustrates a crank shaft 90 supported by and mounted to a main bearing within a crank case of a vehicle engine. The crank shaft is integrally formed with a crank pins 91, crank arms 92, and crank journals 93. Balancing weights 94 are attached for maintaining a rotational balance of the crank shaft 90 during engine operation.

The crank shaft 90 converts a high speed reciprocating motion of a group of pistons to a rotating motion of the crank shaft. A lubricating oil (engine oil) is supplied for reducing friction and heat build up associated with the engagement of the crank shaft, connecting rods, and pistons. The lubricating oil is supplied to the required areas through oil holes formed in the crank shaft 90. The oil holes 95 supply oil to the crank shaft bearings and crank shaft connecting portions. A portion of the oil supplied to a main bearing of the crank shaft is compressed and conveyed through the oil holes 95 (shown in FIG. 5).

The inlet locations of the oil holes 95 may vary with different sized crank shafts (as shown by the solid and dotted line representations of FIG. 4). The inlet portions S of the oil holes 95 immediately after drilling include a very sharp edge. In order to reduce the sharp edge, a chamfer is formed about the oil hole inlet portion S using a cutting tool 96, as illustrated in FIG. 5.

Since the location of the inlet portion S of the oil holes 95 vary with different sized crank shafts, a forming tool, or a set of forming tools, are currently required to align the location and angle of each different oil hole inlet portion S.

Accordingly, the many working devices currently required to form chamfers for the different locations of the oil holes 95 result in costly equipment and divided manufacturing processes.

SUMMARY OF THE INVENTION

Therefore, an object of the present invention includes providing a single chamfer forming apparatus for a crank shaft oil hole in which a spindle chuck is variably positioned in response to different locations of an inlet portion of a crank shaft oil hole.

Another object of the present invention includes creating a more efficient and less costly manufacturing process by providing a forming apparatus designed to chamfer a crank shaft oil hole at a single manufacturing location.

In order to attain the above objects, the present invention contemplates a chamfer forming apparatus for removing a sharp edge of an inlet portion of a crank shaft oil hole. The apparatus includes a rack gear for linear vertical movement in response to an oil cylinder device, a pinion gear rotated by the displacement of the rack gear, a housing for receiving the rack gear and pinion gear, a drum provided coaxial with the pinion gear and exterior of the housing, a spindle chuck eccentrically mounted to the drum for receiving a chamfer forming tool, an adjusting bracket with two stopper members mounted to a top portion of the drum, and a fixing bracket mounted to the housing for limiting a rotation of the drum within a predetermined angle range through contact with the stopper members.

BRIEF DESCRIPTION OF THE DRAWINGS

FIG. 5 illustrates a chamfer forming operation in accordance with the present invention.

DETAILED DESCRIPTION OF THE PREFERRED EMBODIMENT

Hereinafter, the preferred embodiment of the present invention will be described in detail with reference to the accompanying drawings.

Figure 1:
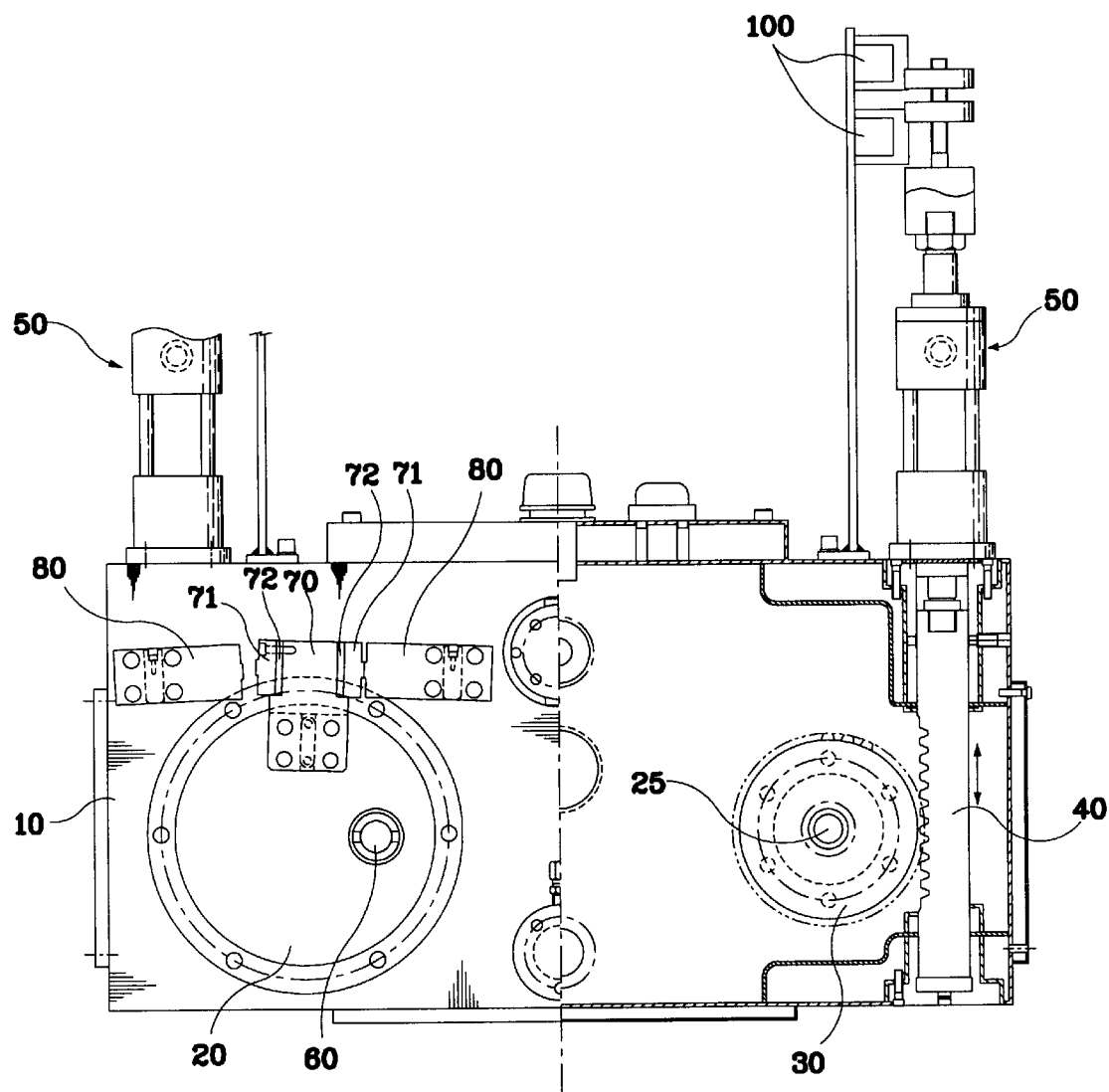
FIG. 1 illustrates a front view with interior and exterior of cross-sections according to an embodiment of the present invention.
Figure 2:
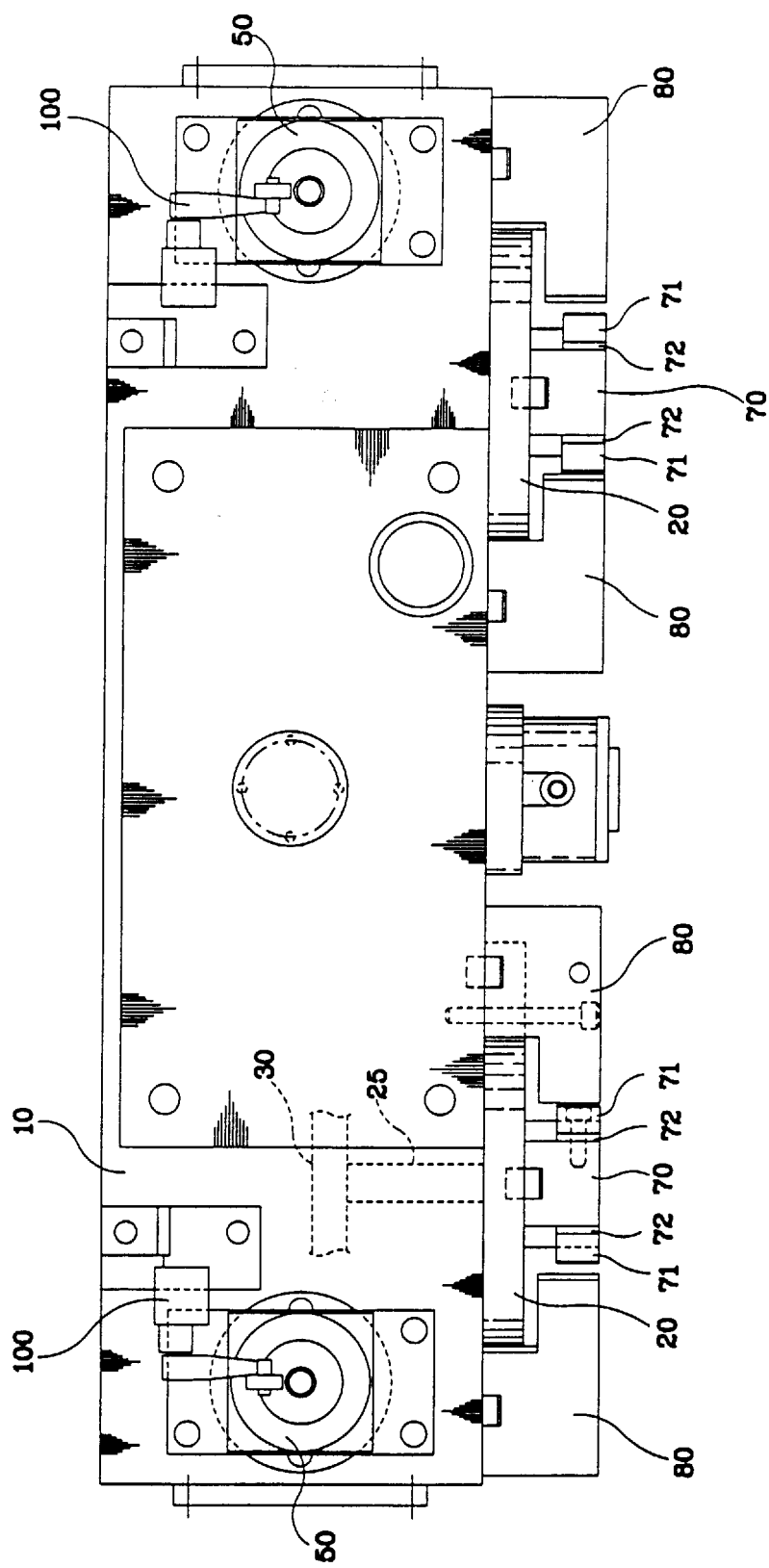
FIG. 2 illustrates a top view of the embodiment of FIG. 1.

FIG. 1 includes a housing 10 with drum 20 is mounted at front portion of the housing 10. The drum 20 is mounted coaxial with a pinion gear 30 received within the interior of the housing 10.

The pinion gear 30 is engaged with a rack gear 40 at one side, and the rack gear 40 is moved linearly upward and downward by an oil pressure cylinder device 50.

A spindle chuck 60 extends from a front face of the drum 20 at a location eccentric to a drum shaft 25. The spindle 60 is rotated by a drive motor (not shown). The eccentric location of the spindle chuck 60 about the drum 20 allows for a rotational movement of the spindle chuck 60. A working tool is mounted in the chuck for forming the chamfer.

An adjusting bracket 70 is fixed to the drum 20 by a fixing means such as a bolt. A stopper 71 is secured by a bolt fixing means to both sides of the adjusting bracket 70. A spacer 72 is interposed between the adjusting bracket 70 and the stoppers 71 for adjusting an extent of the adjusting bracket 70 and stoppers 71.

Further, a fixing bracket 80 is mounted to the housing for restricting a rotation of the drum 20. The fixing bracket 80 includes two contact points for contacting the stoppers 71.

Moreover, since chamfers are required at both ends of the crank shaft 90, a drum 20 and a working spindle chuck 60 are provided symmetrically about both sides of the housing 10.

The oil pressure cylinder 50 is provided with top and bottom limit switches 100 for limiting an operating stroke within a predetermined range.

In accordance with the present invention, the crank shaft 90 formed with the oil hole inlet portions S is clamped to a front end of the apparatus. A chamfer working tool 96 is then mounted in the spindle chuck 60 and positioned in alignment with the oil hole inlet S. When the working tool and oil hole inlet portion S are not aligned, the stoppers 71 are adjusted to the exact oil hole position by adjusting the thickness of the spacer 72.

Figure 3:
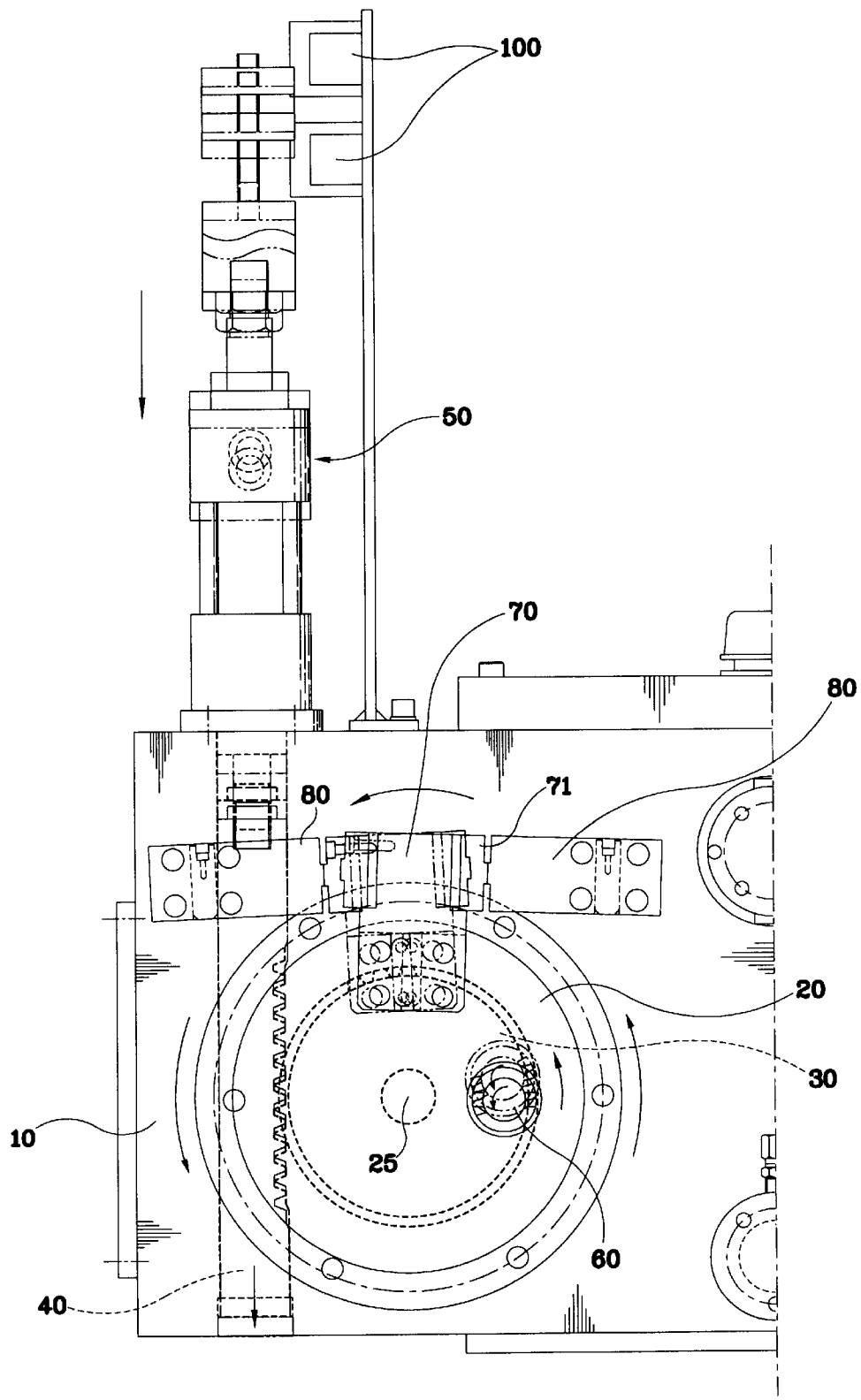
FIG. 3 illustrates an operating state of the embodiment of FIG. 1.
Figure 4:
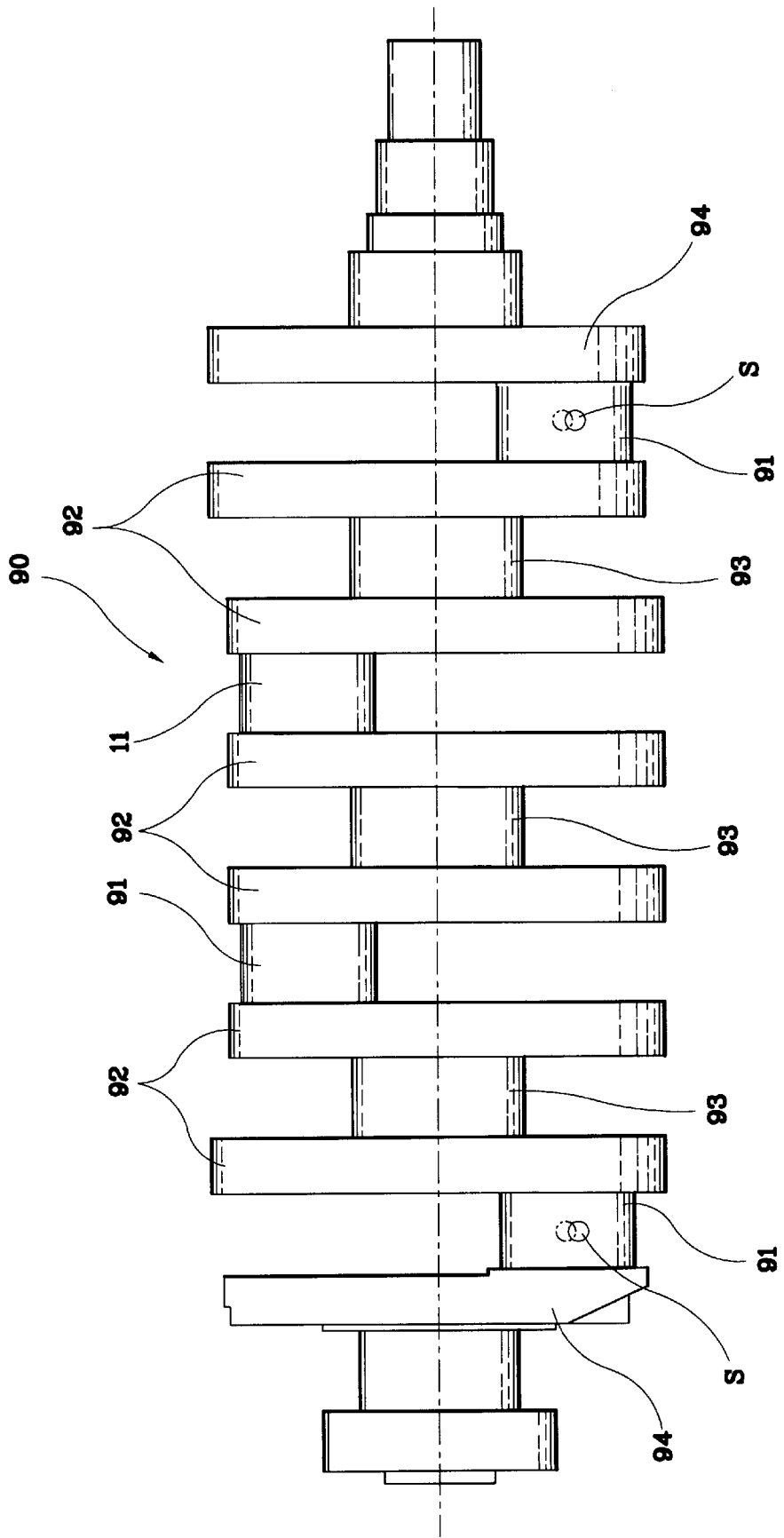
FIG. 4 illustrates a crank shaft in accordance with the invention.

If the oil hole inlet is located at a different location because a different crank shaft size is being processed, the oil pressure cylinder 50 is utilized. Consequently, the rack gear 40 is displaced causing a rotation of the pinion gear 30. Accordingly, the pinion gear 30 rotates the drum 20 so that the spindle chuck 60 is moved between the fixing bracket 80. Thus, when the spindle chuck 60 is moved into position by the drum 20 (as shown in FIG. 3), the adjusting bracket 70 is simultaneously rotated limited by contact between the stoppers 71 and the fixing bracket 80.

If, at this point, an end of the working tool is not exactly aligned with the oil hole inlet portion S of the crank shaft 90, the position of the tool is adjusted by adjusting the thickness of the spacer 72.

While the operation set forth above limits the allowable rotation angle of the adjusting bracket 70, the rotation of the drum is further controller by limit switches 100 associated with the oil pressure cylinder 50.

Accordingly, since the drum 20 is rotatably controlled by both the limit switches 100 and the fixing bracket 80, the spindle chuck 60 can be positioned to the exact working position of the inlet portion S.

In accordance with the present invention, reduced costs and manufacturing time can be achieved by utilizing a single apparatus to form chamfers in crank shafts having different oil hole locations. The chamfering apparatus can be adapted simply by changing the working tool for the working of crank shafts having different sizes and oil hole positions. Such an apparatus provides for a wide range of utilities.

What is claimed is:

1. A chamfer forming apparatus for removing a sharp edge formed on an inlet portion during an oil hole drilling operation of a crank shaft, a chamfer forming apparatus for a crank shaft oil hole comprising:

a rack gear ascending and descending by an oil pressure cylinder;

a pinion gear rotated by linear motion of said rack gear;

a housing containing said rack gear and pinion gear;

a drum coaxially mounted to said pinion gear and mounted to an exterior of said housing;

a spindle chuck eccentrically mounted to said drum and chucking a chamfer working tool;

an adjusting bracket fixedly mounted to a front end of said drum, and has attached thereto a stopper member secured at two different sides of the adjusting bracket; and a fixing bracket provided on the housing to limit a rotation of the drum within a predetermined angle range by contacting a stopper member upon movement of the drum.

2. A chamfer forming apparatus for a crank shaft oil hole as defined in claim 1, wherein movement of said oil pressure cylinder is limited by upper and lower limit switches for limiting an ascending and descending stroke of the rack gear.

3. A chamfer forming apparatus for a crank shaft oil hole as defined in claim 1, wherein said stopper is releasably secured to the adjusting bracket, and a spacer is interposed between the stoppers and the adjusting bracket.

4. A chamfer forming apparatus for a crank shaft oil hole as defined in claim 3, wherein a thickness of said spacer is adjusted for setting an exact angle range of drum rotation.

* * * * *